April 12, 1960 W. J. WILLIAMS 2,932,366
BRAKE CONSTRUCTION
Filed July 26, 1956 4 Sheets-Sheet 1

INVENTOR
WILLIAM J. WILLIAMS

BY Strauch, Nolan & Neale
ATTORNEYS

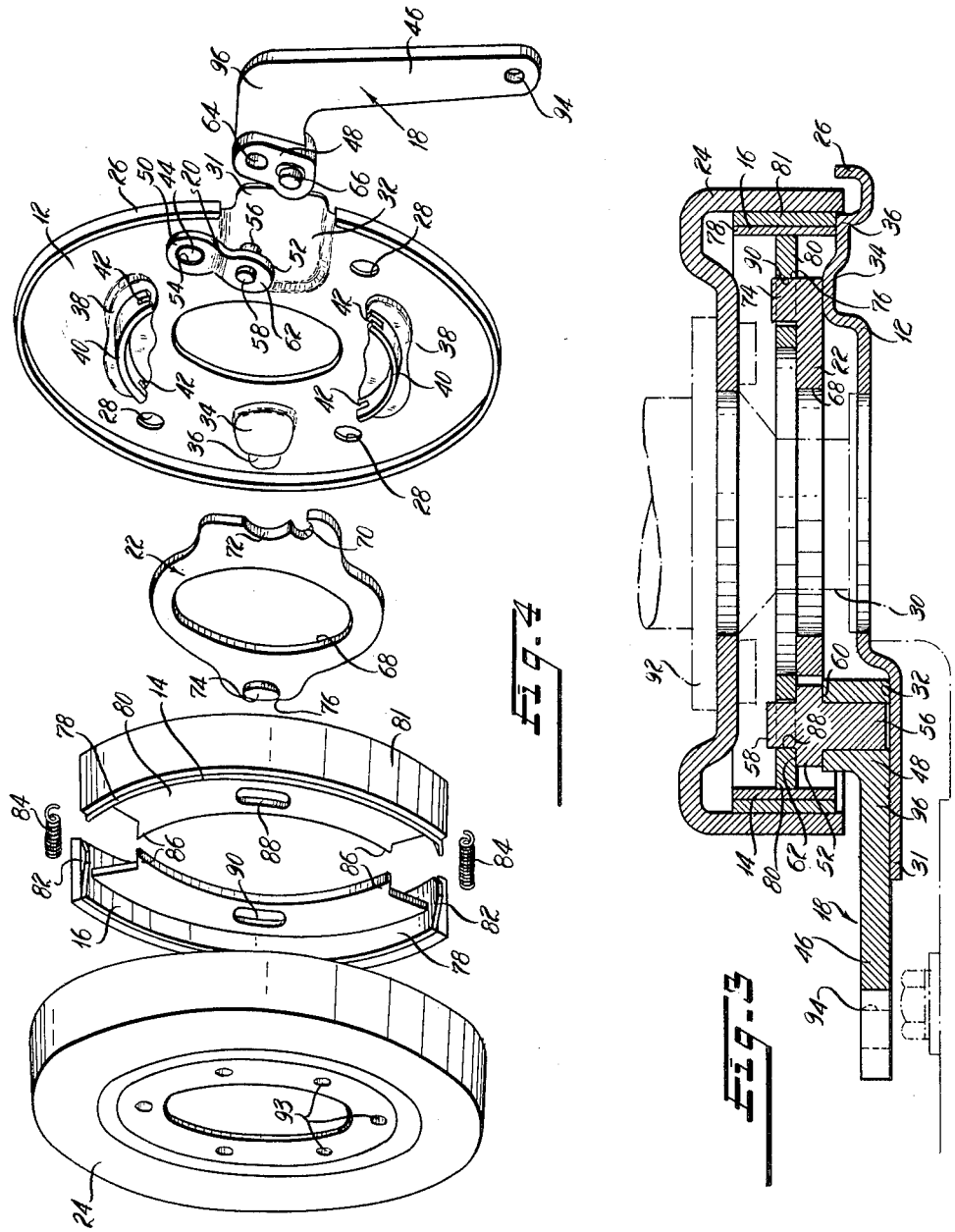

INVENTOR
WILLIAM J. WILLIAMS

BY Strauch, Nolan & Neale

ATTORNEYS

INVENTOR
William J. Williams

United States Patent Office 2,932,366
Patented Apr. 12, 1960

2,932,366

BRAKE CONSTRUCTION

William J. Williams, Ashtabula, Ohio, assignor to Rockwell-Standard Corporation, a corporation of Pennsylvania Application July 26, 1956, Serial No. 600,337

14 Claims. (Cl. 188—78)

This invention relates to improvements in brake mechanisms and has particular reference to a two-shoe internally expanding brake with floating actuating toggle components and free-floating shoes.

This improved construction provides an internally expanding brake free of internal adjusting means and enables balanced braking action which is equally effective for forward or reverse brake drum rotation. In this brake construction, the magnitude of brake shoe actuating force relative to applied force is properly proportioned and remains within acceptable limits for any degree of brake actuation.

Including the brake drum, nine components constitute the preferred embodiment of this brake construction. These components include a simplified backing plate with integral or welded shoe abutment members, a lever pivoted on the backing plate, a two part floating actuating toggle assembly, two floating brake shoes, two shoe springs and the brake drum. Because the free floating nature of the shoes and actuating mechanism results in the aforementioned balanced braking action in both directions of rotation, the drum and shoes can be made of steel stampings which are lighter and less expensive than hitherto considered possible.

Floating shoe brake assemblies are known in the prior art and brake construction providing true balanced braking force application to a pair of floating brake shoes is described and disclosed in copending application Serial No. 453,824 filed September 2, 1954 by Bryan E. House et al., now Patent No. 2,852,105.

The brake construction disclosed and claimed in this application is an improvement over the structure in the above noted copending application. It provides novel simplicity over the relatively few number of parts in the former brake, has smaller actuating components enabling installations in small diameter brakes which have limited clearance, has a greater ease in removal and replacement of parts and also incorporates novel structural cooperation between the relatively moving shoes and backing plate which permits a savings in manufacturing costs. In obtaining added advantages in manufacturing, assembly, service and replacement, the brake construction of this invention retains all advantages of the structure in the copending application, including (1) simplicity of construction which enables unskilled assembly and simplified stocking of parts, (2) no lubrication required and no adjustment necessary to compensate for wear, (3) the mechanism is enclosed to protect against dust, dirt, water and other contaminations and corrosion, reducing fire hazard in some critical installations, (4) the assembly is light in weight, approximately one-half the weight of an ordinary brake, (5) the manufacturing cost is low because light-weight steel stampings can be used in shoes, backing plate and drums as against cast components required in ordinary band type brakes and (6) the balanced application of braking force on both shoes in both directions of rotation is retained and provides uniform brake shoe wear giving a constant smooth braking performance.

Accordingly a primary object of this invention resides in the provision of novel, improved two-shoe internally expanding brakes in which shoe actuating mechanism applies actuating force to the brake shoes proportionally, within acceptable limits, for any degree of brake actuation.

A further object resides in the provision of novel brake structure enabling use of a stamped steel drum.

Another object resides in providing novel brake mechanism in which the shoes and novel assemblage of brake actuating members are mounted for free-floating movement across the brake.

A still further object resides in providing a novel floating actuating assemblage for a floating shoe brake mechanism having a substantially directionally direct application of actuating force from an actuating lever toggle arm through intervening actuating assemblage to the brake shoes.

Still another object resides in the provision of novel brake mechanism for realizing equal braking torque for both directions of drum rotation.

A further object resides in providing a novel brake mechanism in which an actuating toggle, a link member and a lever are aligned, axially restrained and supported by cooperation between the backing plate, the brake shoes and the shoe abutment members.

Another object resides in providing an efficient and flexible small size actuating mechanism, for an internally expanding brake, capable of efficient operation with limited internal clearances in the brake.

A still further object resides in providing a floating shoe mechanism free of internal adjusting means. Further novel features and adjects of this invention will become apparent from the following detailed description and the appended claims taken in conjunction with the accompanying drawings showing a preferred embodiment thereof, in which:

Figure 3 is a cutaway and sectioned view taken on lines 3—3 of Figure 1, illustrating further brake details;

Figure 4 is an exploded perspective view illustrating components of the brake assembly;

Figure 1:
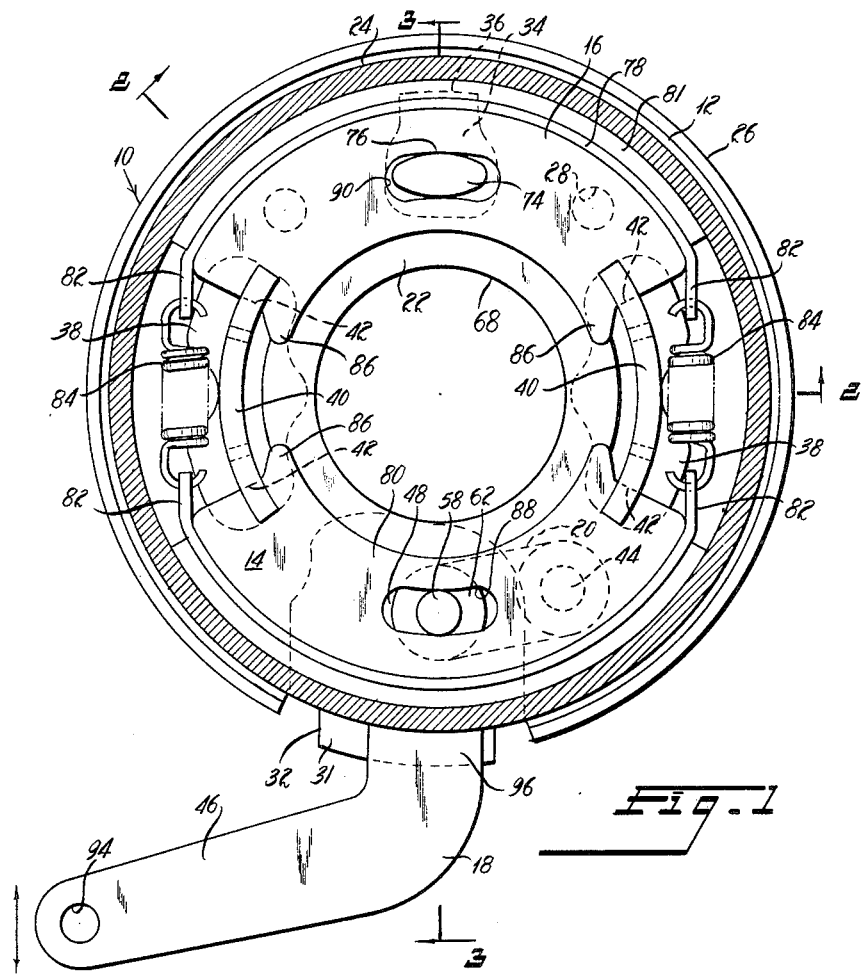
Figure 1 is an end view of the new improved brake constructed according to this invention, the brake drum being sectioned to show the inner structure.

Referring now to Figures 1 and 4, the improved brake assembly 10 includes a backing plate 12, brake shoes 14 and 16, actuating components 18, 20 and 22 and a drum 24. Shoes 14 and 16 are identical and reversible in and to each position, but are designated by different reference characters for purposes of providing a more concise explanation in this description.

Because the brake assembly will enable use of steel stampings for the drum and backing plate, the backing plate 12 is preferably formed from a steel stamping. It has a flanged peripheral rim 26 that overlaps the periphery of stamped steel drum 24, providing an effective dust, dirt and moisture seal. The drum and backing plate can be made by any desirable method. Various holes 28 in the plane portion of backing plate 12 enable the backing plate to be secured by bolts or rivets to a stationary housing flange or support structure surrounding and suitably supporting a rotatable shaft 30 indicated by phantom lines in Figure 3. Shaft 30 may be an engine driven propeller shaft. A short section of peripheral rim 26 is cut and bent down as a lip 31 leaving a short segment of the backing plate periphery, rimless, for a purpose to be described. The bent down lip 31 is radially coextensive with an indentation 32 providing a support shelf for actuating component 18. Diametrically opposite the shelf indentation 32 is a raised boss 34 with a radially outer portion stepped back to form an adjoining boss 36 lower than the boss 34. Offset 90 degrees between the indentation shelf 32 and boss 34 are two similarly shaped raised portions 38 having flat planar upper surfaces.

Suitably fastened on the top of each raised portion 38 is a rigid arcuate brake shoe abutment member 40. These members 40 can be welded, staked or riveted to the backing plate and are arranged diametrically opposite one another and are equally spaced from the center of backing plate 12. Each end of each abutment member 40 has a recess 42 formed therein with sides disposed parallel to the major plane portion of backing plate 12 which is normal to the brake axis. The recesses 42 provide guiding and abutment means for the floating shoes 14 and 16 as will be hereinafter described. Raised portions 38 extend radially inward a short distance from abutment members 40 and provide support at each side of actuating component 22 as will become apparent.

Between one of the abutment members 40 and recessed shelf 32, a pivot post 44 is suitably fixed by welding or staking to the backing plate 12 and projects a short distance toward the brake drum.

Figure 9:
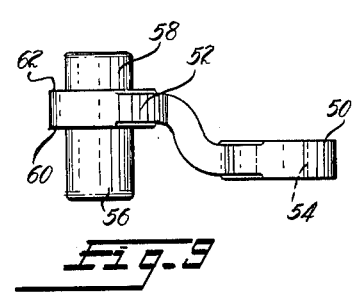
Figure 9 illustrates lever detail.
Figure 10:
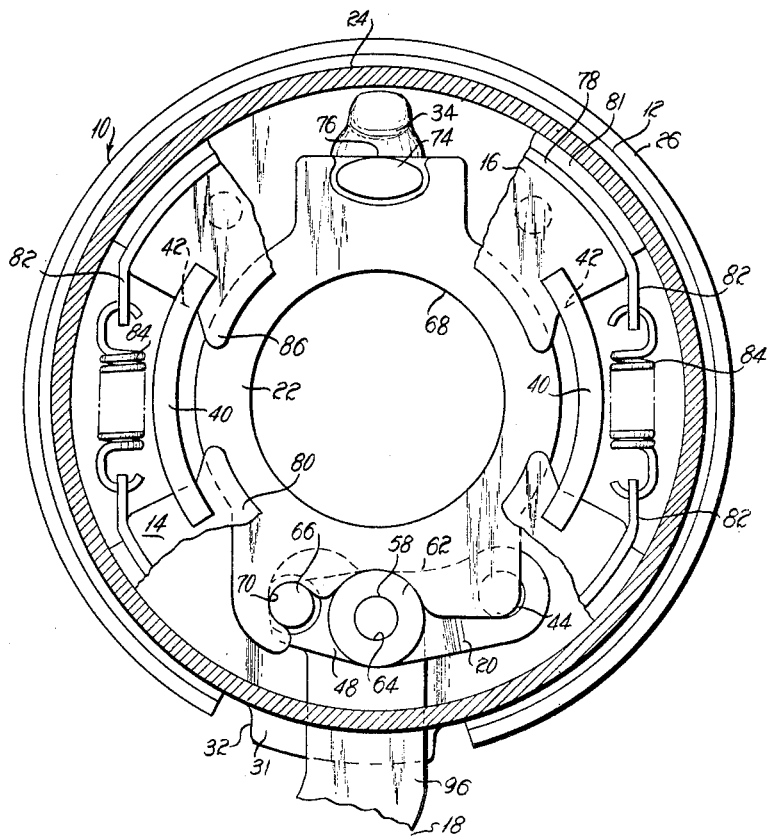
Figure 10 is a view similar to Figure 1 with the brake shoes partially broken away to illustrate the cooperative engagement between the brake actuator assembly components.

The actuating components 18, 20 and 22 are assembled on the backing plate 12 before installation of brake shoes 14 and 16. An actuating toggle component 18 has an operating lever end 46 and a heavy toggle end 48 with a flat back face which is disposed on and slidably engages the recessed shelf 32, as clearly shown in Figure 2. Actuating component 20 is a short lever having one end 50 axially offset from the other end 52 (Figure 9). Lever end 50 is formed with flat bearing surfaces and includes an aperture 54 enabling the lever 20 to be pivotally disposed on post 44. The opposite lever end 52 being offset, is positioned away from the recessed shelf 32 and includes coextensive lower and upper pin or post projections 56 and 58, respectively, the common axis of which is parallel to the axis of aperture 54 in the opposite end 50. Flat annular shoulders 60 and 62 on end 52 surround posts 56 and 58 respectively. When the lever 20 is assembled with aperture 54 over the backing plate post 44, the lower lever post 56 in end 52 will extend into a bore 64 formed in the heavy toggle end 48 of the toggle actuator 18. A rotatable fit is provided between post 56 and bore 64. Integral with the heavy end 48 of toggle actuator 18 and offset to one side of bore 64 is a toggle pin 66. The upper surface of the heavy end 48 of toggle actuator 18 is flat and parallel to the backing plate 12, lying in the same plane with the upper surface of boss 34 and the upper surfaces of bosses 38 and substantially diametrically opposite the boss 34.

Actuating component 22 is a flat link member with a center opening 68 providing clearance around the shaft 30 to permit unobstructed transverse floating movement of the link member 22 across the backing plate 12. One end of link member 22 is formed with a socket 70 and an adjacent recess 72. The opposite end of link member 22 has an upstanding boss 74 with a curved pressure surface 76 on its radially outward side and a similar pressure surface on its inner side. In assembly, actuating link 22 rests on the upper surface of bosses 38, boss portion 34 and the flat upper surface of heavy operating end 48 of actuating toggle 18 with its socket 70 fitted over the toggle pin 66 in actuating toggle 18. In this position, shown in Figures 1 and 2, sufficient clearance is provided between the sides of link member 22 and the brake shoe abutments 40 and the center opening 68 and the shaft 30 to provide floating movement of the link member 22 in any direction transverse of the shaft 30 within the limits of required operational movement. In assembly the recess portion 72 of link member 22 provides operating clearance from the end 52 of lever 20 which is also disposed on the upper surface of toggle end 48 of actuating toggle 18. Lever 20 and link member 22 have the same thickness dimension, therefore the upper surfaces of lever end 52 and link member 22 are in the same plane parallel to backing plate 12 which is coextensive with the rear edge of the abutment slots 42.

Each of the identical brake shoes 14 and 16 has a lining platform 78 and an integral web 80 and the brake shoe is symmetrical relative to a plane through the center of web 80 and parallel to the web and also symmetrical about a transverse plane through the center line of the brake shoe. Friction brake linings 81 are fastened to each shoe table. Each end of brake shoe platform 78 has a bent lip 82, apertured on either side of the center line to provide anchors for the brake springs 84. Shoe web end tabs 86 are formed integral with and at the inside edge of each end of shoe webs 80 and, when the shoes are assembled, coact with the abutment members 40 to maintain shoe alignment during actuating and deactuating movement and also to minimize shoe abutment slap. An arcuate slot 88 in the web of brake shoe 14 and an identical slot 90 in the web of brake shoe 16 are provided at the web midpoints. Brake shoe 14 is disposed in the brake assembly with the abutment edges of webs 80 fitted into respective abutment slots 42 in the backing plate abutment members 40 with the web tabs 86 projecting on the inner side of abutment members 40. In this position the arcuate shoe web slot 88 of shoe 14 is positioned over the upper post 58 of lever 20 and the back side of web 80 of brake shoe 14 rests on the upper annular shoulder 62 of lever 20 and the upper surface of the adjacent end of link member 22. This cooperation, together with the cooperation of the shoe abutment ends in the abutment slots 42 provides axial positioning of brake shoe 14. Brake shoe 16 is disposed on the opposite sides of abutments 40 with the abutment ends of its web 80 fitted in abutment slots 42 and with its shoe web tabs 86 disposed inside the abutment members 40. The arcuate slot 90 in the web 80 of brake shoe 16 fits over the boss 74 on link member 22 with the rear side of web 80 in abutment against surface of link member 22 and the edge of table 78 resting on the low boss section 36 of backing plate 12 (shown in Figure 3). This structural cooperation between brake shoe 16, the link member 22 and backing plate 12 together with the coaction between the abutment ends of web 80 and the abutment member slots 42 provide axial positioning and alignment for the brake shoe 16.

Figure 2:
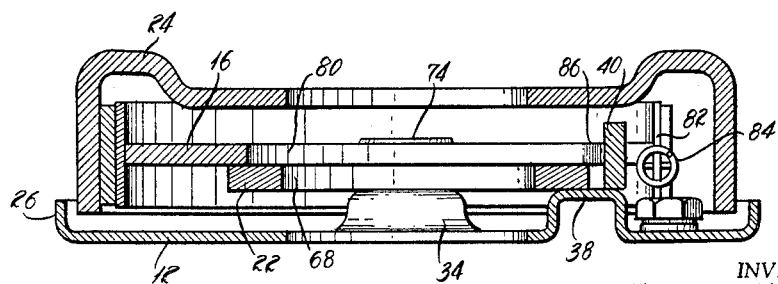
Figure 2 is a cutaway and sectioned view taken along lines 2—2 of Figure 1, to illustrate cooperative structural details.
Figure 5:
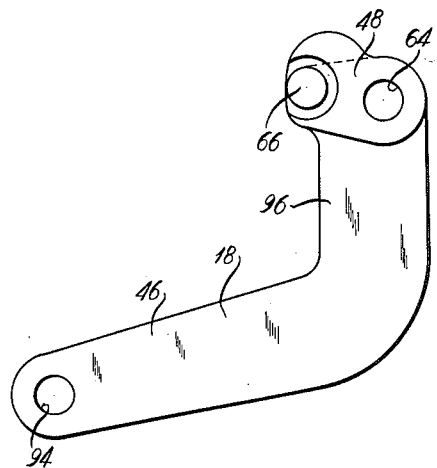
Figures 5 and 6 illustrate actuating toggle component details.
Figure 6:
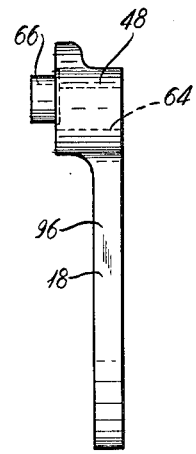
Figures 7, 8:
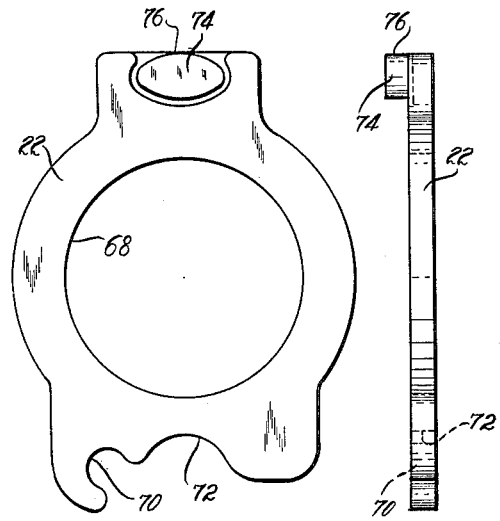
Figures 7 and 8 illustrate actuating link member detail.
Figure 11:
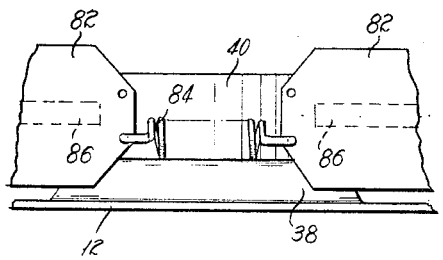
Figure 11 is a detail view showing the spring connection between two brake shoe tables and illustrates the offset of the spring connection toward the brake backing plate from the shoe webs.

Shoe return springs 84 extend between the bent lips 82 of opposed ends of the two brake shoes 14 and 16. Springs 84 are anchored in apertures in lips 82 which, as clearly shown in Figures 2 and 11, are disposed between the webs 80 and the backing plate 12. This displacement of the return springs 84 from the plane of the shoe web and abutment slots 42 toward the backing plate 12 causes a pivotal force on the shoes about the point of engagement of the web abutment ends and slots 42 that maintains the brake shoes biased toward the backing plate 12. These shoes 14 and 16 being urged by the return springs 84 toward the backing plate will maintain link member 22 between the shoe webs 80 and the raised boss surfaces of bosses 34 and 38 and the upper surface of the heavy end 48 of actuating toggle 18. This same biasing force on the web of brake shoe 14 will maintain the end 52 of lever 20 in close assembled engagement relative to the actuating toggle 18 and this coaction will maintain lever 20 on the pivot post 44.

The brake drum 24 is disposed to surround the two brake shoes 14 and 16 inside the peripheral rim 26 of backing plate 12 (Figure 3). In this position, when drum 24 is non-rotatably fastened to a flange 92 of the shaft 30 as by rivets passing through openings 93 and flange 92, a sufficient space is provided between the periphery of drum 24 and the recessed shelf 32 to enable operative disposition of the operating handle 46 of toggle actuator 18 from the interior to the exterior of brake assembly 10. The free end of toggle actuating arm 46 is apertured at 94 for connection with the brake operating device (not shown). Thus, toggle actuator 18 is rotatably mounted on a movably mounted pivot post 56 and provides a proportional lever determined by the spacing between the aperture 94 in arm 46, the pivot bore 64 in the heavy operating end and the distance between toggle pin 66 and bore 64. The operating arm 46 is bent at an angle to the portion 96 that extends from the interior of the brake assembly 10. This arrangement provides a linkage whereby a direct pull perpendicular to operating arm 46 toward the brake assembly will be in substantially the same direction as the force that moves the brake shoes into engagement with the relatively rotatable brake drum 24.

Operation

When arm 46 of toggle actuator 18 is moved toward the brake assembly 10 for brake actuation, the heavy operating end 48 forms a reaction pivot against the lower post 56 of lever 20. Toggle pin 66 being disposed in socket 70 of link member 22 tends to move link member 22 across the backing plate 12 toward the opposite side of the brake assembly. Link member boss 74 being disposed in the arcuate slot 90 of brake shoe 16 will engage the outer edge of slot 90 with the pressure surface 76 tending to force brake shoe 16 toward the brake drum 24. Lever 20 being pivotally mounted on backing plate post 44 will tend to swing toward the periphery of the brake assembly. There is in effect a torque couple generated between lever post 58 and toggle pin 66 and lever post 58 being disposed in the arcuate slot 88 of brake shoe 14 will tend to move shoe 14 into engagement with drum 24. These oppositely directed forces resulting from the effective torque couple between upper post 58 of lever 20 and toggle pin 66 move the two brake shoes 14 and 16 apart from one another against the biasing force of springs 84. When shoes 14 and 16 are moved away from abutment between webs 80 and the abutment edges of abutment slots 42, the entire assembly of actuating toggle 18, lever 20, link member 22 and the two brake shoes 14 and 16 is freely floating. Force applied to move each of shoes 14 and 16 into brake actuation is equalized. Initial contact of the brake shoes with rotating drum 24 will cause slight circumferential movement of the shoes until an appropriate abutment end of the web 80 of each shoe reengages the associated abutment shoulders of abutment slots 42. Because of the floating arrangement of the actuating assembly 18, 20 and 22 the brake actuation force is equally divided between the two shoes 14 and 16 regardless of the direction of rotation of drum 24. The proportioned operating force between the end of long lever 46 and pivotal bore 64 developed in the toggle pin 66 which has a very short lever arm is substantially the same ratio for all degrees of brake actuation and regardless of any minute changes in this proportioned ratio the equalized brake application force on each shoe is maintained throughout the life of the brake.

As set forth in the foregoing description the invention provides an improved two-shoe internally expanding brake mechanism with a floating actuating assembly and free floating shoes so as to be self-adjusting. This invention provides a proportional brake actuating force applied in equal components to each of the two brake shoes and this proportioned ratio remains substantially the same within acceptable applicating force limits for any degree of brake actuation. The invention provides an internally expanding two-shoe brake that does not require and does not have internal adjusting means. It also provides an internally expanding two-shoe brake having equalized brake torque that provides the same braking force for both directions of brake drum rotation. It further provides compact actuating components capable of highly satisfactory operation within limited clearance spaces provided in small diameter brakes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake assembly having a fixed backing plate, a rotatable member and a brake drum fixed to said rotatable member: a pair of arcuate brake shoes supported by said backing plate; a toggle assembly actuating means, including an operating lever member and means articulatively mounting said lever member on said backing plate comprising mounting means on which said operating lever is supported for pivotal movement about a first axis and means mounting said mounting means on said backing plate for swinging movement of said lever and mounting means about a second axis parallel to and offset from said first axis, structurally cooperating with said shoes to exert equal and opposite brake engaging forces on said shoes upon brake actuating swinging and pivoting movement of said operating lever member to move the shoes into braking engagement with said drum whereby the braking torque applied by each of the brake shoes to the brake drum is equal regardless of the direction of drum rotation.

2. A brake assembly as defined in claim 1, wherein said toggle assembly actuating means comprises: a first part which incorporates said operating lever member; abutment means carried by said means articulatively mounting said lever member adjacent said first axis, and in engagement with the approximate midpoint of one brake shoe; a second part pivotally engaged with said first part at a position offset from said two named axes; and a second abutment means, carried by said second part, in engagement with the approximate midpoint of the other brake shoe; so that movement of said operating lever member pivoting said first part on its pivot mount applies brake actuating force through said first abutment to said one shoe through said second part and said second abutment with said other shoe so the lines of actuating force between said abutments and the respective shoes are substantially direct and parallel.

3. In a brake assembly having a fixed backing plate, a rotatable member and a brake drum fixed to said rotatable member; a pair of arcuate brake shoes supported by said backing plate; and a toggle assembly actuating means structurally cooperating with the backing plate and said shoes to exert equal and opposite brake engaging forces on said shoes to move the shoes into braking engagement with said drum whereby the braking torque applied by each of the brake shoes to the brake drum is equal regardless of the direction of drum rotation; said toggle assembly actuating means comprising a lever pivotally mounted at one end on said backing plate, a toggle lever, means pivotally joining said lever and said toggle lever and providing an actuating abutment in engagement with one of said brake shoes, and means pivotally connected to said toggle lever and in abutting engagement with the other of said brake shoes.

4. In a brake assembly as defined in claim 3, said means pivotally joining said lever and said toggle lever and providing an actuating abutment for one of said brake shoes comprises: an aperture provided in said toggle lever and two pins on said lever, one of which is disposed in said aperture and the other of which consists of an abutment in engagement with said one brake shoe.

5. In a brake assembly as defined in claim 4, said means pivotally connected to said toggle lever and in abutment engagement with said other brake shoe comprises: a flat plate member having a socket at one end and an abutment boss at the other end; and a pin is provided in said toggle lever projecting into said socket.

6. In a brake assembly as defined in claim 5, each said brake shoe being identically constructed so it can be reversible in either position and comprising a shoe web having a curved slot centrally disposed in said web, said shoes being assembled in said brake with the slot of one shoe positioned over said other pin on said lever and the slot of the other shoe positioned over said abutment boss on said flat plate member.

7. An expansible brake mechanism comprising: a backing plate having diametrically disposed shoe abutment members; a lever pivoted on said backing plate; a two part floating actuating toggle assembly, one part having an integral operating lever and being pivotally mounted on said lever, the other part being pivotally engaged by said one part and extending across said backing plate between said abutment members; two arcuate brake shoes with friction linings and end abutments disposed diametrically on said backing plate between said abutment members; shoe springs connected to adjacent ends of said shoes urging said shoe end abutments into engagement with said abutment members; said abutment members and backing plate having means which with said springs coact with said shoes to determine the axial position of said shoes relative to said backing plate, said springs being disposed to maintain said shoes against said means; and each part of said two part toggle assembly having means engaging respective ones of said shoes to move said shoes radially outward upon actuating movement of said operating lever.

8. In a brake assembly, a support, spaced abutments rigid with the support, a pair of oppositely facing arcuate brake shoes, springs interconnecting said brake shoes and urging opposite ends of the brake shoes towards said abutments, a toggle actuator with an operating arm, means rockably mounting said toggle actuator on said support for limited float in a path substantially normal to the brake axis, a link member in cooperative engagement with said toggle actuator and disposed for movement by said toggle actuator in a path substantially normal to the brake axis, and motion transmitting means on said toggle actuator and on said link member for operatively connecting said toggle actuator and link member to respective brake shoes so that rocking movement of said toggle actuator results in substantially radial displacement of said brake shoes.

9. An expansible brake mechanism comprising a support, a pair of oppositely facing circumferentially floating arcuate brake shoes, abutments on said support interposed between the adjacent ends of said shoes, resilient means connecting and biasing said shoes to a deactuated position against said abutments, and a brake actuator comprising a toggle, means swingably mounting said toggle on said support, a link member movably mounted on said support and operatively connected to said toggle, means on said link member and toggle mounting means operably connected to the respective brake shoes, and said toggle member and link having coordinated floating movement with said shoes in a path substantially normal to the arcuate brake shoe axes of curvature.

10. An internally expanding brake mechanism comprising: a support having a pair of diametrically spaced abutments, a pair of oppositely facing arcuate brake shoes resiliently mounted on said support against said abutments, a self-centering actuator assembly comprising a rockable member pivoted on said support, a toggle pivoted on said rockable member, a link member mounted in floating disposition on said support and in engagement with said toggle, said actuator assembly being operatively interposed between said brake shoes, with said toggle engaging one of said shoes and said link member engaging the other of said shoes, and operative when said toggle is actuated to exert equal and oppositely directed brake actuating forces on said brake shoes by respective portions of said toggle and said link member.

11. In an internally expanding two shoe brake, a rotatable drum adapted to be mounted on a rotating member, a brake backing plate adapted to be mounted to a support member, two shoe abutment members rigid with said brake backing plate in diametrically opposed relation across the brake, brake shoes having linings for frictional engagement with said drum disposed between said abutments, spring return means operatively connected to and extending between adjacent ends of said brake shoes, an actuating lever, a mounting lever pivotally mounted to said brake backing plate, a first pin integral with said mounting lever, an opening in said actuating lever receiving said mounting lever pin with a rotatable fit, a second pin projecting from said mounting lever in actuating contact with one of said brake shoes, a pin projection from said actuating lever, an actuating link member in operative abutment with said actuating lever pin projection and with an integral boss in actuating contact with the other of said brake shoes, said actuating link member extending transversely across the brake from said actuating lever pin projection to said other brake shoe and said actuating link member being provided with an opening enabling clearance from the rotating member.

12. In the internally expanding brake defined in claim 11, said opening in said actuating lever and said pin projecting from said actuating lever being spaced relative to each other to provide an actuating toggle on said actuating lever with the opening in said actuating lever transmitting shoe actuating thrust to said first pin on said mounting lever and through said second pin on said mounting lever to one of said brake shoes and with said pin projecting from said actuating lever simultaneously transmitting shoe actuating thrust to said actuating link member and through said integral boss to the other of said brake shoes when said actuating lever is moved for brake actuation.

13. In the internally expanding brake defined in claim 12, said brake shoes, said actuating lever, the pin end of said mounting lever and said actuating link member being disposed for free floating transversely across said brake to permit ratio proportioning of brake shoe actuating forces because of the actuating toggle spacing relation of said opening in said actuating lever and said pin projecting from said actuating lever.

14. In a brake assembly having a relatively rotatable brake drum, a stationary support, a pair of brake shoes mounted on said support, fixed abutments on said support at the adjacent ends of said brake shoes, means resiliently urging said shoes toward said abutments, and means for moving the shoes toward said drum comprising a lever pivoted on said support, an actuating member pivoted to said lever, a link mounted for movement transversely of said support, means providing slide pivot connections between the respective brake shoes and the link and lever respectively, and means providing a pivotal connection between the link and said actuating member.

References Cited in the file of this patent

UNITED STATES PATENTS 2,051,088  Kittle et al. _____ Aug. 18, 1936